(12) United States Patent
Hennig et al.

(10) Patent No.: US 9,375,985 B2
(45) Date of Patent: Jun. 28, 2016

(54) VALVE STEM WITH AUXILIARY PORT

(75) Inventors: Mark Kevin Hennig, Corpus Christi, TX (US); Peter N. M. I. Fountain, Leetonia, OH (US)

(73) Assignee: Equalaire Systems, Inc., Corpus Christi, TX (US)

( * ) Notice: Subject to any disclaimer, the term of this patent is extended or adjusted under 35 U.S.C. 154(b) by 481 days.

(21) Appl. No.: 13/816,298

(22) PCT Filed: Aug. 23, 2011

(86) PCT No.: PCT/US2011/048760
§ 371 (c)(1),
(2), (4) Date: Feb. 26, 2013

(87) PCT Pub. No.: WO2012/027335
PCT Pub. Date: Mar. 1, 2012

(65) Prior Publication Data
US 2013/0269849 A1    Oct. 17, 2013

Related U.S. Application Data

(60) Provisional application No. 61/376,144, filed on Aug. 23, 2010.

(30) Foreign Application Priority Data

Aug. 23, 2011   (WO) .................. PCT/US2011/04876

(51) Int. Cl.
*B60C 23/10*   (2006.01)
*B60C 29/00*   (2006.01)
(Continued)

(52) U.S. Cl.
CPC ............. *B60C 29/005* (2013.01); *B60C 23/003* (2013.01); *G05D 7/03* (2013.01); *B60C 29/068* (2013.04); *Y10T 137/87708* (2015.04)

(58) Field of Classification Search
CPC .... B60C 29/005; B60C 29/00; B60C 29/002; B60C 29/02; B60C 29/06; B60C 29/068; B60C 23/003; G05D 7/03; F16K 15/207; F16K 15/20
USPC .......................... 152/427, 415, 416, 417, 429
See application file for complete search history.

(56) References Cited

U.S. PATENT DOCUMENTS

| | | |
|---|---|---|
| 1,072,907 A | 9/1913 | Brooks |
| 1,083,847 A | 1/1914 | McDowell et al. |

(Continued)

FOREIGN PATENT DOCUMENTS

| | | |
|---|---|---|
| EP | 1 099 574 A1 | 5/2001 |
| EP | 1 652 696 A1 | 5/2006 |

(Continued)

OTHER PUBLICATIONS

European Search Report issued Oct. 7, 2014, in co-pending European patent app. No. 14173320.4 (6 pages).
(Continued)

*Primary Examiner* — Jason Bellinger
(74) *Attorney, Agent, or Firm* — The Pizarro Firm (57) ABSTRACT

A valve stem may comprise an auxiliary port. Devices such as an air pressure gauge, a tire pressure monitoring system sensor, temperature gauges and one-way valves may be mounted to the auxiliary port. A valve stem with auxiliary port may be used in an automatic tire inflation system. A sleeve may be translatably mounted to the valve stem to cover and uncover the auxiliary port.

3 Claims, 5 Drawing Sheets

(SECTION A-A)

(51) Int. Cl.
  *B60C 23/00* (2006.01)
  *G05D 7/03* (2006.01)
  *B60C 29/06* (2006.01)

(56) References Cited

U.S. PATENT DOCUMENTS

| | | | |
|---|---|---|---|
| 1,112,596 | A | 10/1914 | Burggraf, Jr. |
| 1,165,057 | A | 12/1915 | Bayly |
| 1,205,504 | A | 11/1916 | Bearce |
| 1,800,780 | A | 4/1931 | Daneel |
| 2,854,018 | A * | 9/1958 | Kilmarx, Jr. .................. 137/223 |
| 3,276,503 | A | 10/1966 | Kilmarx |
| 4,387,931 | A | 6/1983 | Bland |
| 4,685,501 | A | 8/1987 | Williams |
| 4,883,106 | A | 11/1989 | Schultz et al. |
| 5,181,977 | A * | 1/1993 | Gneiding et al. ............. 152/429 |
| 5,377,736 | A | 1/1995 | Stech |
| 5,584,949 | A | 12/1996 | Ingram |
| 5,694,969 | A * | 12/1997 | DeVuyst ....................... 137/226 |
| 5,769,979 | A | 6/1998 | Naedler |
| 5,868,881 | A | 2/1999 | Bradley |
| 2,947,172 | A | 9/1999 | Glotin |
| 6,105,645 | A | 8/2000 | Ingram |
| 6,131,631 | A | 10/2000 | Bradley |
| 6,145,559 | A | 11/2000 | Ingram, II |
| 6,167,900 | B1 * | 1/2001 | Laird ............................ 137/227 |
| 6,325,124 | B1 | 12/2001 | Colussi et al. |
| 6,394,556 | B1 | 5/2002 | Ingram |
| 6,425,427 | B1 | 7/2002 | Stech |
| 6,435,238 | B1 | 8/2002 | Hennig et al. |
| 6,698,482 | B2 | 3/2004 | Hennig et al. |
| 6,772,812 | B1 | 8/2004 | Hamilton |
| 6,938,658 | B2 | 9/2005 | Jarrett et al. |
| 7,191,796 | B1 | 3/2007 | Rehmert, Jr. |
| 7,273,082 | B2 | 9/2007 | White et al. |
| 7,404,412 | B2 * | 7/2008 | Milanovich et al. .......... 137/226 |
| 7,690,412 | B1 | 4/2010 | Jenkinson et al. |
| 8,146,413 | B1 | 4/2012 | Grace |
| 2003/0015241 | A1 | 1/2003 | Fogal, Sr. |
| 2004/0000364 | A1 | 1/2004 | Hennig et al. |
| 2004/0173296 | A1 | 9/2004 | White et al. |
| 2006/0173648 | A1 | 8/2006 | Chang |
| 2007/0227640 | A1 | 10/2007 | Ingram |
| 2008/0047613 | A1 * | 2/2008 | Huang .......................... 137/226 |
| 2008/0185086 | A1 * | 8/2008 | Ingram et al. ................. 152/417 |
| 2009/0283190 | A1 | 11/2009 | Padula et al. |

FOREIGN PATENT DOCUMENTS

| | | |
|---|---|---|
| GB | 714099 | 8/1954 |
| WO | WO2011/163274 | 12/2011 |
| WO | WO2012027335 | 3/2012 |

OTHER PUBLICATIONS

International Search Report and Written Opinion issued in corresponding PCT Patent App. No. PCT/US11/48760 dated Feb. 26, 2013 (10 pages).

International Preliminary Report on Patentability issued in corresponding PCT Patent App. No. PCT/US11/48760 dated Feb. 2, 2012 (9 pages).

European Search Report issued Dec. 5, 2013 in co-pending European patent app. No. 11820500.4 (7 pages).

* cited by examiner

VALVE STEM WITH AUXILIARY PORT

This application is a U.S. National Stage Application claiming priority to PCT Patent Application Serial No. PCT/US2011/048760 entitled "VALVE STEM WITH AUXILIARY PORT," filed 23 Aug. 2011, which claims priority to U.S. Provisional Patent Application 61/376,144 entitled "Valve Stem with Auxiliary Port," filed Aug. 23, 2010, both of which are hereby entirely incorporated herein by reference.

FIELD

The disclosed method and apparatus generally relate to tire pressure maintenance.

BACKGROUND

Automatic tire inflation systems may rely on standard vehicle tire valve stems. Standard vehicle tire valve stems may not provide an auxiliary port for allowing an alternate path for air flow or for mounting auxiliary devices. There exists a need for a valve stem having an auxiliary port that is suitable for use with an automatic tire inflation system.

SUMMARY

A wheel end assembly comprising a hubcap mounted to a wheel rotatable on an axle, the wheel-end assembly comprising: a rotary union in or mounted to the hubcap, the rotary union in sealed fluid communication with an air pressure supply, an air hose having a first end and a second end, the first end connected to the rotary union so as to allow air to flow from the air pressure supply through the air hose, and a valve stem mounted to the wheel so as to allow inflation of a pneumatic tire, the valve stem comprising a first one-way valve and an auxiliary port, wherein the second end of the air hose is connected to the valve stem so as to allow fluid communication of pressurized air therewith. The wheel end assembly may further comprise one of an air pressure gauge, tire pressure monitoring system sensor, temperature sensor and a second one-way valve, mounted to the auxiliary port. The second one-way valve may further comprise a pressure relief valve oriented so as to be capable of releasing air from the pneumatic tire, or oriented so as to be capable of allowing air to be added to the pneumatic tire.

An automatic tire inflation system for a pneumatic tire mounted to a wheel, the wheel having a hubcap mounted thereto, the system comprising: an air pressure supply, a rotary union in or mounted to the hubcap, the rotary union in sealed fluid communication with the air pressure supply, an air hose having a first end and a second end, the first end connected to the rotary union so as to allow air to flow from the air pressure supply through the air hose, and a valve stem mounted to the wheel so as to allow inflation of a pneumatic tire, the valve stem comprising a one-way valve and an auxiliary port, wherein the second end of the air hose is connected to the valve stem so as to allow fluid communication of pressurized air therewith.

An improved valve stem having disposed therein along its long axis a fluid channel, the improved valve stem comprising a base end configured for mounting to a wheel; a post end having a normally-closed one-way valve mounted in the fluid channel; one or more auxiliary ports disposed between the base end and the post end, the one or more auxiliary ports being in fluid communication with the fluid channel; a sleeve translatably disposed about the stem so as to allow closing and opening of the auxiliary ports; and a first seal disposed adjacent the one or more auxiliary ports for sealing engagement between the stem and sleeve.

DETAILED DESCRIPTION

Figure 1:
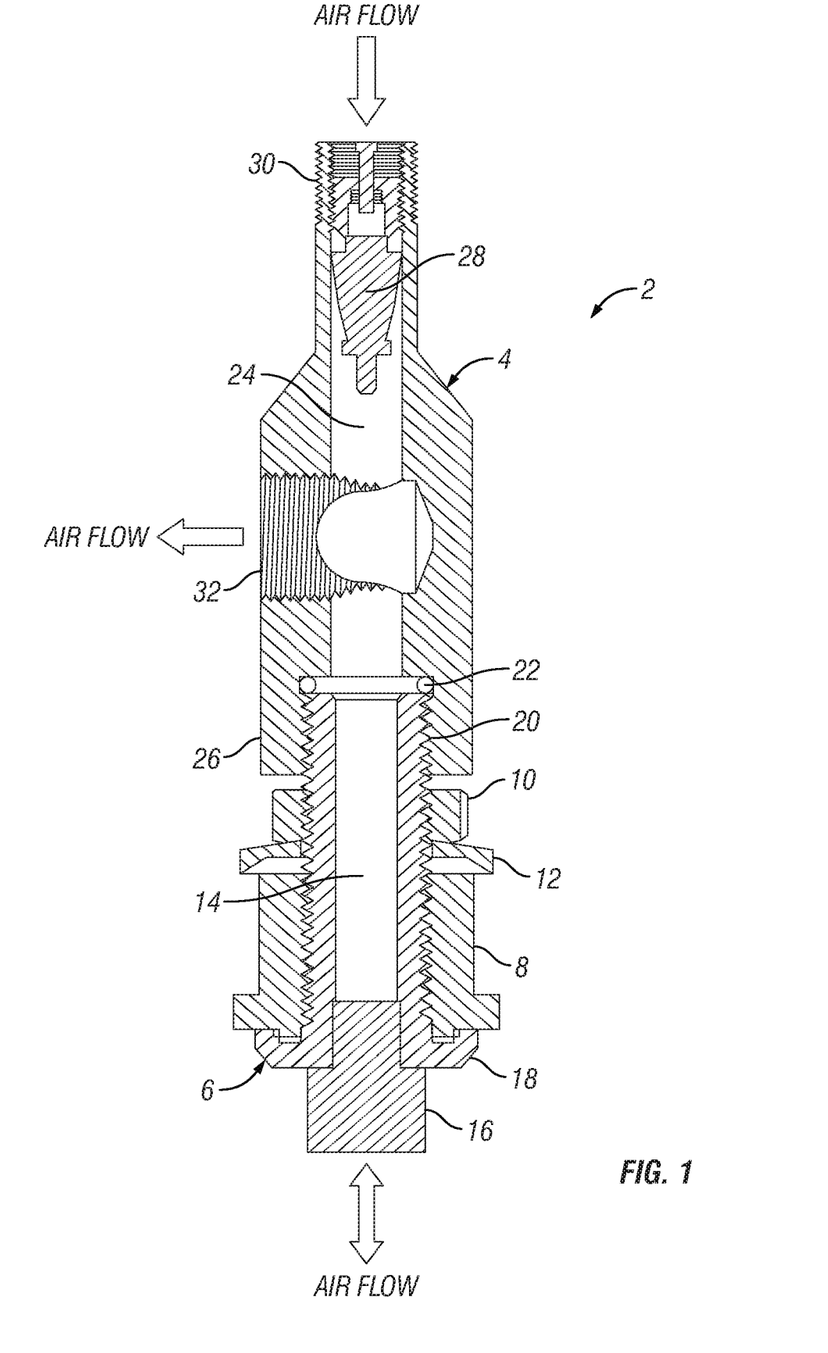
FIG. 1 illustrates one embodiment of a valve stem having an auxiliary port.

As may be seen in the embodiment of FIG. 1, an improved tire valve stem 2 may comprise a post 4 and a base 6. The base 6 may be fitted within a seal 8 configured to allow snap-in mounting of the base 6 in a hole in a tire rim (not shown) in much the same manner as a standard tire valve stem. A nut 10 and a washer 12 may be removably mounted to the base 6, such as by threading, so as to retain the base 6 within the seal 8. The seal may be rubber, polyurethane, nylon or any suitable sealing material. In some embodiments, the base 6 may be retained within the seal by any suitable means, such as by friction fit, flanges, locking tabs, adhesives, and the like. Alternatively, the base 6 may be welded or threaded directly into a hole in a tire rim (not shown). The base 6 may include an air channel 14, located generally along the long axis of the base 6, that allows air to flow through the base 6. An air filter 16 may be mounted to a first end 18 of the base 6 to prevent contaminants from the pneumatic tire from entering the valve stem 2.

The post 4 may be removably mounted to a second end 20 of the base 6, such as by threaded attachment. Of course, the post 4 may be removably mounted to the base 6 by any suitable means, such as by friction fit, adhesives, detent pins, and the like, or be permanently mounted. In other embodiments, the post 4 and base 6 may be a unitary item of manufacture. In such embodiments, the words "post" and "base" may simply refer to portions of the item. A seal 22 may be provided to seal the connection between the post 4 and the base 6. The seal may be, for example, an o-ring, compression washer or adhesive, and may be of any suitable material, e.g., rubber, polyurethane, nylon or any suitable sealing material. The post 4 may include an air channel 24, located generally along the long axis of the post 4, that allows air to flow through the post 4. Mounting of a first end 26 of the post 4 to the base 6 may allow air to flow between the air channel 24 of the post 4 and the air channel 14 of the base 6. A valve core 28, such as a SCHRADER® valve, may be removably mounted, such as by threading, within a second end 30 the post 4. The valve core 28 may comprise a one-way valve that permits air to flow into the air channel 24 in one direction, but not the other. In the disclosed embodiment, the valve core may allow air to flow into the air channel 24 through the second end 30 of the post 4, but not in the other direction.

The post 4 may be provided with one or more auxiliary ports 32 that extend from the air channel 24 in a generally radial direction to the outer surface of the step portion 4. The auxiliary port 32 may allow a variety of components to be mounted to the valve stem 2. The auxiliary port 32 may be threaded, such as 1/8 NPT, to allow such components to be removably mounted. In one embodiment, a one-way pressure relief valve may be removably mounted to the auxiliary port to allow tire pressure in excess of the desired pressure to escape to the atmosphere. For example, air may be added to a cold tire so as to achieve a manufacturer-recommended tire pressure. As the tire heats up during use, the tire pressure may increase beyond a manufacturer-recommended tire pressure. Similarly, as a tire is driven from a lower elevation to a higher elevation, the tire pressure may increase. It may thus be desirable to release the excess tire pressure.

For example, an automatic pressure relief valve (not shown) may be mounted to the auxiliary port and configured to remain closed until the tire pressure exceeds approximately the manufacturer-recommended tire pressure or some other desired pressure. When the tire pressure exceeds the recommended tire pressure, the pressure relief valve may open to allow air to escape, thus lowering the tire pressure. When the tire pressure reaches approximately the recommended pressure, the pressure relief valve may close to prevent further air loss. The pressure relief valve may thus be configured to automatically open when the tire pressure increases above a pressure threshold, and automatically close when the tire pressure drops below a pressure threshold.

In other embodiments, a tire pressure monitoring sensor and/or tire temperature monitoring sensor may be removably mounted to the auxiliary port. For example, a tire pressure and/or temperature monitoring sensor may include a SMARTIRE®/SMARTWAVE® tire pressure monitoring system (TPMS) wireless tire sensor made by Bendix Commercial Vehicle Systems. An auxiliary port may provide a convenient way to mount such a sensor to the wheel without having to alter the tire rim.

In yet other embodiments, a tire valve stem having an auxiliary port may be used in connection with a tire inflation system, such as those disclosed in, for example, U.S. Pat. Nos. 6,698,482, 6,105,645 or U.S. Pub. App. No. 2009/0283190. As may be seen in FIG. 2, a vehicle 100 may comprise a truck 102 and a trailer 104. The truck 102 may include one or more drive axles 106 as part of the vehicle's powertrain. The truck 102 may further include a steer axle (not shown in detail) having pivotable spindles that may provide steering capability for the vehicle 100. The trailer 104 may include one or more fixed axles (not shown). Each axle may have one or more wheels 108 mounted thereto. A pneumatic tire 110 may be mounted to each wheel 108.

Figure 2:
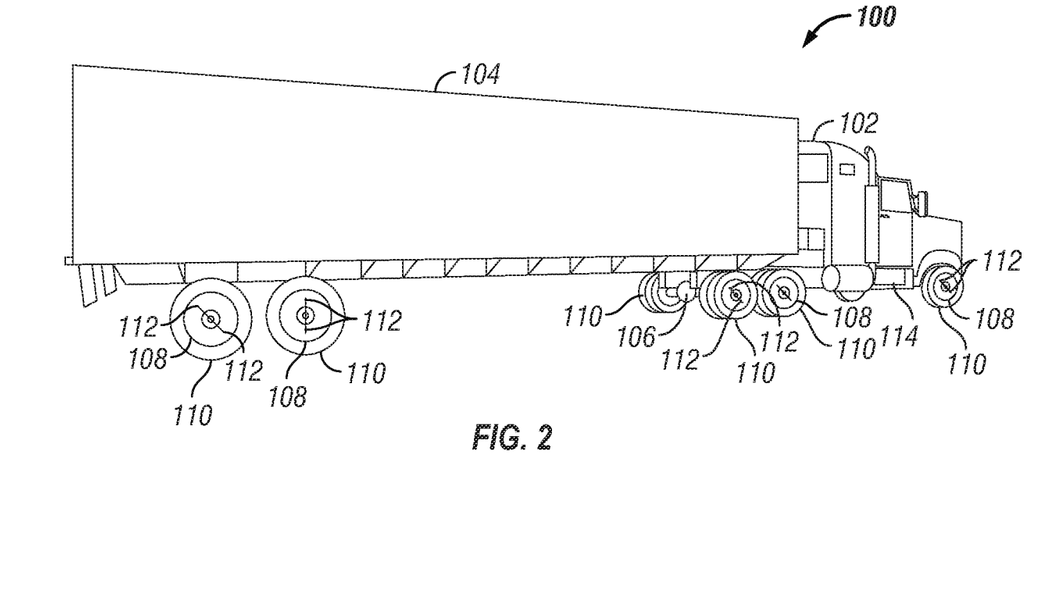
FIG. 2 illustrates one embodiment of a vehicle having an automatic tire inflation system.

The vehicle 100 may be provided with an automatic tire inflation system (such as is shown in FIG. 2) that uses pressurized air from the vehicle's air brake system 114 or some other source of pressurized air to maintain the tires at a desired air pressure. The automatic tire inflation system may be used to control air pressure in one or more of the tires 110 mounted to the steer (not shown), drive 106 and trailer axles (not shown). The automatic tire inflation system may include one or more air hoses 112 in fluid communication with each tire 110 for communicating air from the air pressure source 114 to and from one or more of the tires 110.

FIG. 2 illustrates in more detail multiple embodiments of an automatic tire inflation system for trailer tires. A trailer 200 may include two axles 202 and 204. Some trailers may have dual tires 206 and 208 mounted at each end of the axles, as may be seen with respect to axle 202. Other trailers may have one wide-base tire 210 mounted at each end of the axles, as may be seen with respect to axle 204. The automatic tire inflation system may generally include a pressure regulator 214 and one or more rotary air connections or rotary unions 216 and 218 mounted in or near the axle ends as described in more detail below. The pressure regulator 214 may receive pressurized air from an air pressure source 220 through a conduit 212. The air pressure source 220 may comprise, for example, a vehicle air brake system air supply, or a step-up or booster pump. The pressure regulator 214 may control or reduce the air pressure from the air pressure source 220 to an air pressure level suitable for inflating the tires 206, 208, 210, such as 110 psi. Pressurized air may flow from the pressure regulator 214 through conduit 222 to the axles 202 and 204.

The axles 202 and 204 may be wholly or partially solid or hollow, and may be configured in a variety of ways. For illustration purposes only, axles 202 and 204 are hollow. For example, in some embodiments, an axle may comprise a solid beam having a spindle attached to each end (not shown). The axle spindles may be configured to allow mounting of wheel bearings upon which a hub may be rotatably mounted (not shown). In other embodiments, an axle may comprise a hollow tube having a spindle attached to each end. The spindles may be hollow, resulting in a hollow axle that is open at each end. Alternatively, the spindles may be wholly or partially solid, resulting in a hollow axle that is closed at each end.

If the axle is open at the end, the axle may be sealed so as to allow the hollow axle to hold pressurized air and to support air conduits or rotary air connections (or components thereof), for example, with a plug or cap disclosed in one of U.S. Pat. Nos. 5,584,949, 5,769,979, 6,131,631, 6,394,556, 6,892,778, and 6,938,658. The open end may also be provided with a plug or cap that may serve more to support air conduits or rotary air connections (or components thereof) than to seal the hollow axle to hold pressurized air, such as a plug or cap disclosed in one of U.S. Pat. Nos. 6,325,124 and 7,273,082.

In the embodiments of FIG. 2, axles 202 and 204 may be hollow sealed axles. In one embodiment, axle 204 may be hollow and may be sealed to serve as a conduit for pressurized air. The air conduit 222 may be sealingly connected to the axle 204 to allow pressurized air to flow from the pressure regulator 214 to the axle 204. The pressurized air may flow through the axle 204 to a rotary air connection 216 mounted in or near the spindle end as described in more detail below. An air hose 224 may be connected to the rotary air connection 216 to the valve stem (not shown) of the wheel 209 to which the tire 210 is mounted, thus allowing pressurized air to flow to and from the tire 210.

In some embodiments, the air conduit 222 may be sealingly connected to a tee 226 to allow pressurized air to flow both to axle 204 and to axle 202. An air conduit 228 may allow pressurized air to flow from the tee 226 to a conduit 230 disposed in axle 202. Axle 202 may carry an air conduit 230 to communicate pressurized air to rotary air connection 218, such as is disclosed in U.S. Pat. Nos. 6,325,124 and 7,273,082. Air hoses 232 may connect the rotary air connection 218 to the valve stems 219 and 221 of the wheels 211 to which tires 206 and 208 are mounted, thus allowing pressurized air to flow to and from the tires 206 and 208. In other embodiments, if the axle 202 is solid, then a channel may be bored in axle 202 to permit positioning of all or part of conduit 230 inside the axle 202.

Figure 3:
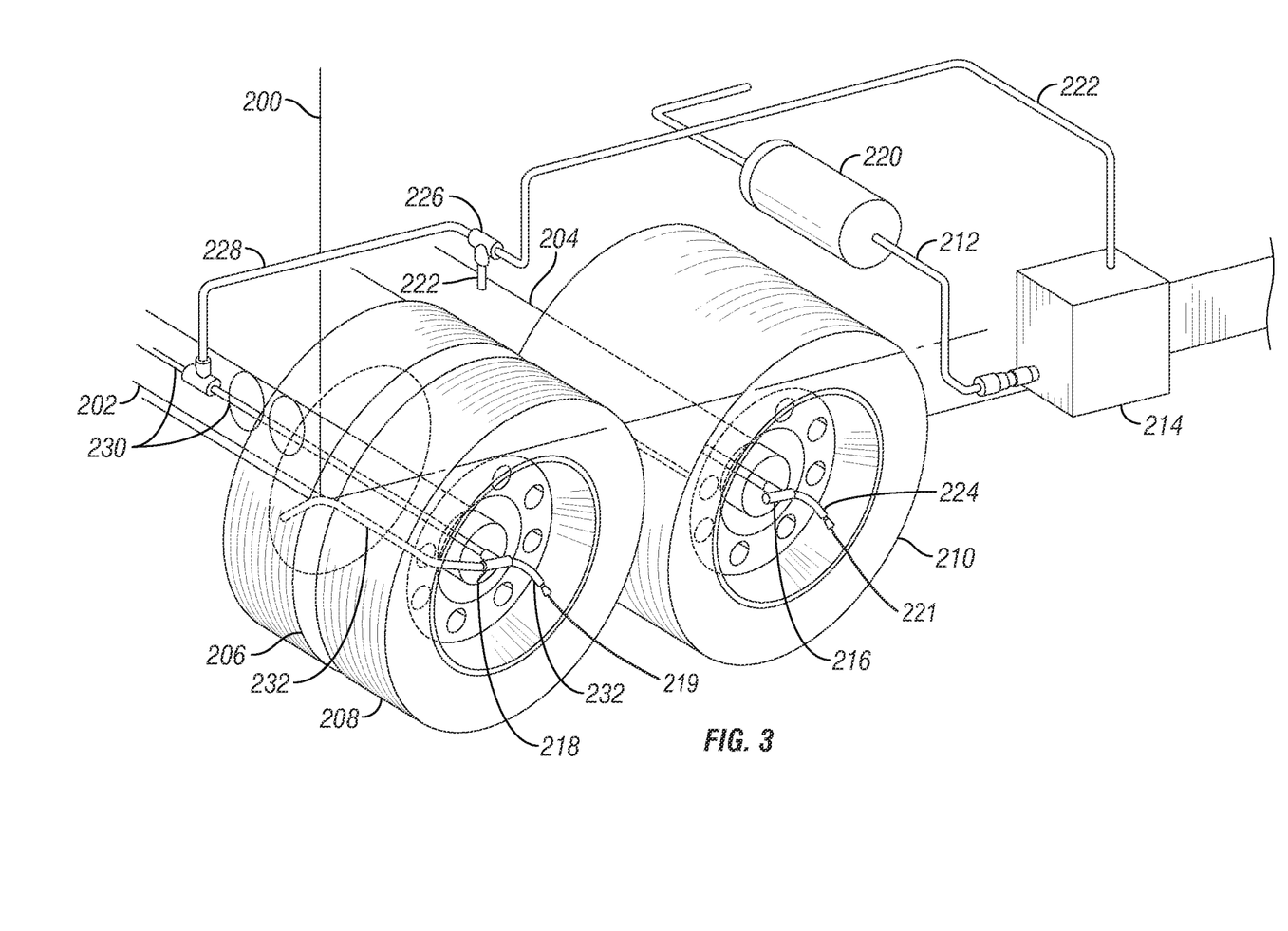
FIG. 3 illustrates the automatic tire inflation system of FIG. 1 in more detail.

With reference to FIGS. 1 and 3, the base 6 of an improved valve stem 2 with auxiliary port may be mounted to each of the rims of tires 206, 208 and 210 in lieu of standard tire valve stems 219 and 221. The air hoses 232 and 224 may be connected to the second end 30 of the improved valve stems 2, such as by threaded attachment. In operation, pressurized air from the air supply may pass through the automatic tire inflation system air lines 222, 228 and 230 to the rotary unions 216 and 218, and from the rotary unions 216 and 218 to the valve stems 2. In each valve stem 2, pressurized air may open the valve core 28, thus allowing air to pass through the valve core 28 through the air channels 24 and 14, and through the filter 16 into the tire. If excess pressure builds in the tire, air may travel back through the filter 16, back through the air channel 14 into air channel 24, and escape out through an automatic pressure relief valve (not shown) mounted in auxiliary port 32. The valve core 28 may remain closed to prevent air from flowing from the tire back into the automatic tire inflation system. In applications for which automatic pressure relief is not desirable, a manual pressure-relief valve may be mounted to the auxiliary port 32, for use in connection with an automatic tire inflation system. In such systems, if the tires are believed to be overpressurized, a driver or maintenance person may manually deflate the tires, for example, prior to starting the vehicle, to a level below the desired tire pressure. When the automatic tire inflation system starts, pressurized air will automatically bring the tires back up to the desired tire pressure.

If another type of device, such as an air pressure gauge (not shown) is mounted in auxiliary port 32, air may communicate between the tire and the device through the air channels 14 and 24, thus allowing the device to register the tire pressure or other air property, such as temperature. In further embodiments, a normally-closed one-way valve, such as a SCHRADER® valve, may be mounted to the auxiliary port to allow another point of entry for pressurized air. such an embodiment may allow air to be added to the tire without having to remove the automatic tire inflation system air hose from the second end 30 of the post 4.

Figure 4A:
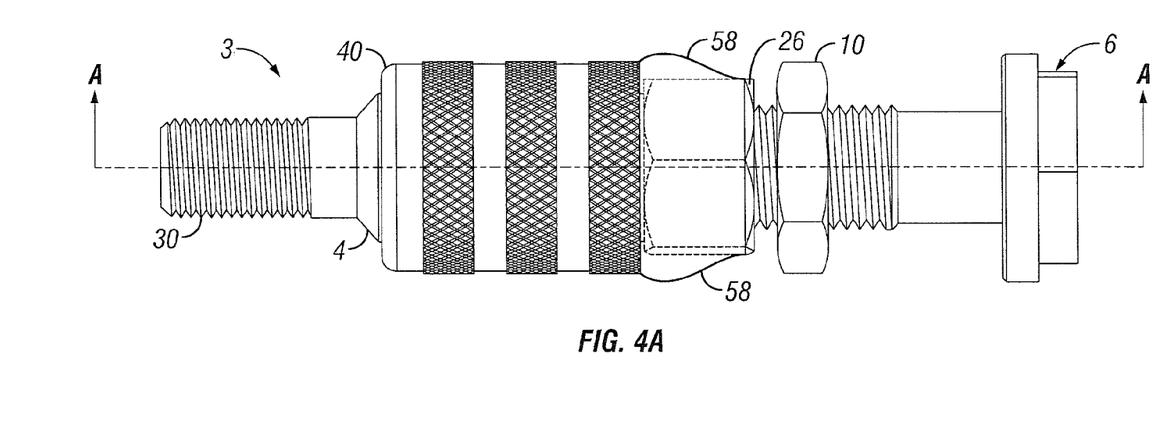
FIGS. 4A and 4B illustrate another embodiment of a valve stem having an auxiliary port and a sleeve in a closed position covering the auxiliary port.
Figure 4B:
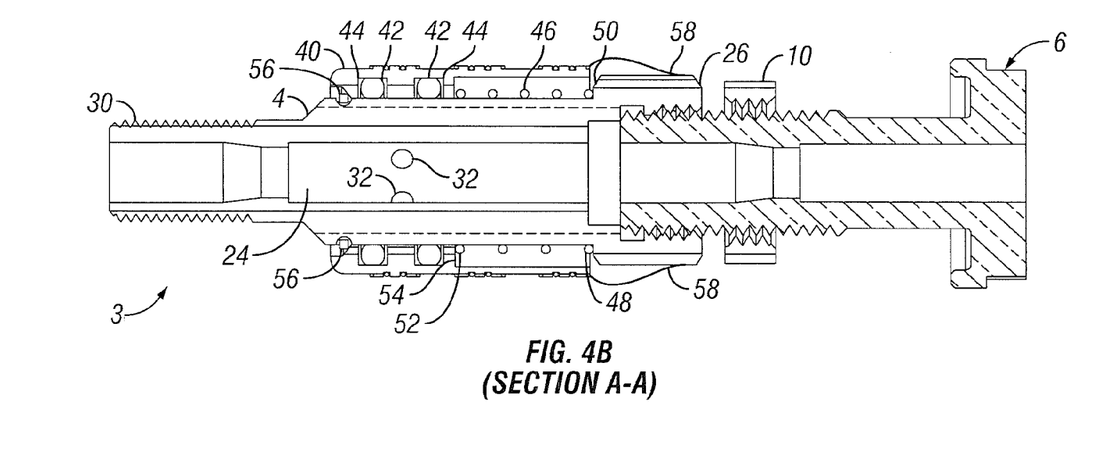

FIGS. 4A and B, and 5A and B illustrate views of another embodiment of an improved valve stem 2. The post 4 may include a sleeve 40 that may be translated along the post 4 so as to cover and uncover one or more auxiliary ports 32. The sleeve may be of any suitably rigid or semi-rigid material, such as metal, plastic, rubber or ceramic. One or more seals 42 may be disposed on the stem so as to allow sealing engagement of the post 4 and sleeve 40. For example, the seals 42 may be mounted circumferentially about the inside of the sleeve 40 in suitably-dimensioned grooves 44. Alternatively, the more seals may be mounted circumferentially about post 4 in suitably-dimensioned grooves (not shown). The seals 42 may be positioned adjacent the auxiliary ports 32, and may provide a sealing interface with the sleeve 40. The seals 42 may be o-rings, lip seals or any suitable seal, and may be of any suitable material, such as nitrile or rubber. In a first position, as shown in FIG. 4, the sleeve 40 may cover the auxiliary ports 32, and the seals 42 may provide a sealing interface with the sleeve 40 above and below the auxiliary ports 32 so as to prevent fluid flow through the auxiliary ports 32. In a second position, as shown in FIG. 5, the sleeve 40 may be disengaged from at least one of the seals 42 above or below the auxiliary ports 32 so as to allow fluid flow through the auxiliary ports 32.

The sleeve 40 may slidably translate from the first position to the second position, and from the second position to the first position. In one embodiment, the first position may be a default or "closed" position, and the sleeve may be biased toward the first position by a spring 46. A first end 48 of the spring 46 may be seated against a shoulder 50 of the post. A second end 52 of the spring 46 may be seated against a shoulder 54 provided on an inner surface of the sleeve 40. In a default or "closed" position of the sleeve 40, the spring 46 may be slightly compressed so as to urge the sleeve 40 along the post 4 into that position. A lock ring 56 or nut may be provided about the post 4 to prevent the sleeve 40 from translating along the post 4 away from the spring 46. Thus, in a default or "closed" position of the sleeve 40, the spring 46 may urge the sleeve 40 against the lock ring 56.

Figure 5A:
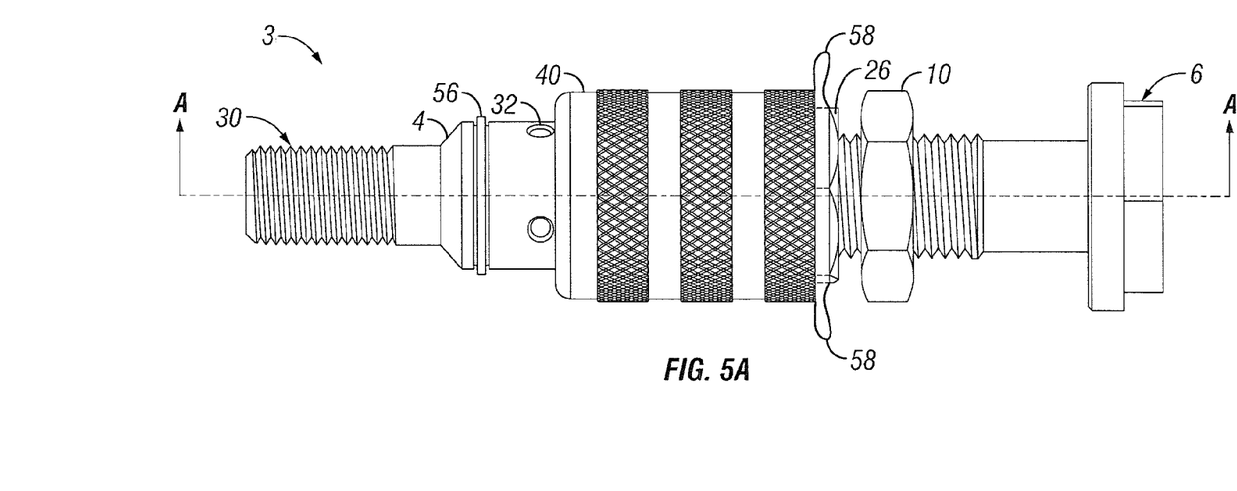
FIGS. 5A and 5B illustrate the embodiment of FIGS. 4A and 4B with the sleeve in an open position uncovering the auxiliary port.
Figure 5B:
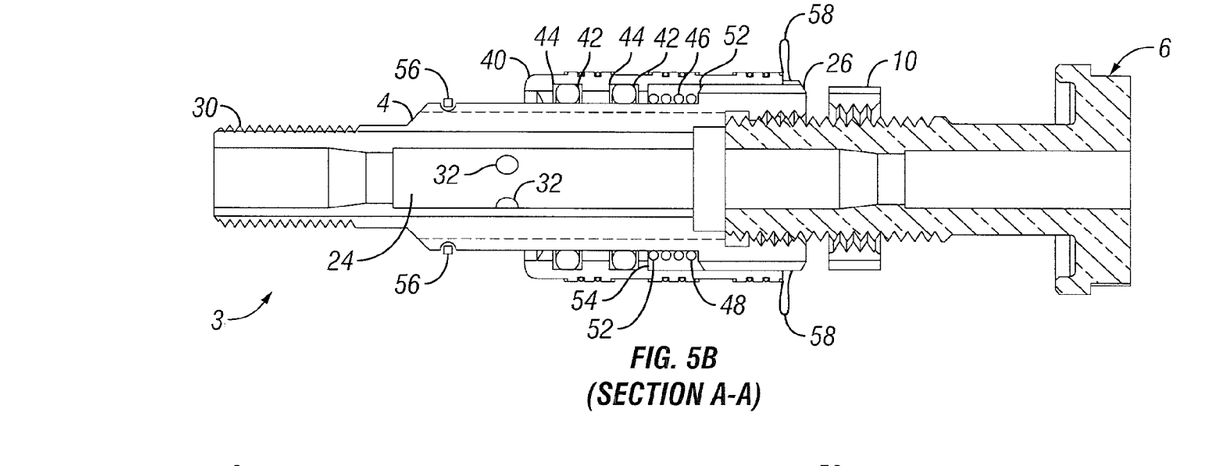

The sleeve 40 may be manually translated along the post 4 from a "closed" position as shown in FIG. 4 to a second or "open" position as shown in FIG. 5 so as to allow fluid communication through the auxiliary ports 32, e.g., air may travel from the air channel 24 to the atmosphere, and vice versa. Translation of the sleeve 40 from the "closed" position to the "open" position may compress the spring 46 such that when the manual force against sleeve 40 is released, the sleeve 40 will translate along the post 4 back to the "closed" position.

In some embodiments, a protective skirt or bellows 58 may extend from the sleeve 40 to the first end 26 of the post 4. The bellows 58, shown in outline form in FIGS. 4 and 5, may be of a flexible material, such as rubber, cloth or silicone. The bellows 58 may be sealed to the sleeve 40 and to the first end 26 of the post 4 to prevent contamination from collecting inside the sleeve 40 and around the spring 46.

In other embodiments, the sleeve 40 may be threadably mounted to the post 4, and may rotatably translate along the post 4 along such threads (not shown). For example, instead of using a spring 46, the post 4 may be threaded and the inside of the sleeve 40 may be threaded to allow threadable mounting of the sleeve 40 to the post 4. The threads may serve as a seal in some embodiments. If the sleeve 40 is threaded to the post 4, then the sleeve 40 may be rotated about the post 4 to effect translation of the sleeve 40 along the post 4 from the "closed" position to the "open" position, and vice versa.

In yet other embodiments, the sleeve 40 may be retained in a "closed" position or "open" position by detents bumps provided on the post, or any other suitable mechanism for preventing the sleeve 40 from translating along the post 4 without application of force, such as grooves in the sleeve 40 to engage one or more of the seals 42.

When installed on a wheel in lieu of standard tire valves 219 and 221 as described above, the improved valve stem 2 of FIGS. 4 and 5 may allow a user to manually deflate a tire to, for example, relieve overpressurization, without having to disconnect the air hoses 232 and 224 of an automatic tire inflation system. Likewise, the improved valve stem 2 may be used in addition to standard valve stems, e.g., as a standalone stem mounted to a wheel, and similarly used to allow manual deflation of a tire.

One or more auxiliary ports 32 may be used in the embodiment of FIGS. 4 and 5. The auxiliary ports 32 may be threaded or non-threaded, and may be sufficiently large to allow relatively rapid deflation of a tire compared to deflation using a standard valve stem. For example, the auxiliary ports 32 may be provided in a quantity and size sufficient to allow deflation of a tire by about 10 psi within about 10 seconds. In other embodiments, the auxiliary ports may be provided in a quantity and size sufficient for use in connection with the system of U.S. Prov. Pat. App. Ser. No. 61/494,327, entitled "Automatic Tire Inflation System with Manual Pressure Relief Valve," the disclosure of which is incorporated entirely by reference.

In yet further embodiments, one or more improved valve stem having an auxiliary port may be provided in addition to a standard valve stem. Other holes may be provided in the wheel to accommodate improved valve stems on a wheel in addition to a standard valve stem.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

What is claimed is:

1. A valve comprising:
   a stem having a longitudinal axis and a fluid channel formed along said longitudinal axis, the stem comprising:
     a base end configured for mounting to a wheel;
     a post end; and
     an auxiliary port disposed between the base end and the post end, the auxiliary port being in fluid communication with the fluid channel;
   a sleeve translatably disposed about the stem so as to allow closing and opening of the auxiliary port;
   a first seal disposed for sealing engagement between the stem and the sleeve, the first seal being disposed about the stem between the auxiliary port and the post end;
   a lock ring disposed between the first seal and the post end;
   a second seal disposed for sealing engagement between the stem and the sleeve, the second seal being disposed about the stem between the auxiliary port and the base end;
   a spring disposed about the stem between the second seal and the base end, the spring engaging the sleeve so as to urge the sleeve against the lock ring;
   wherein when the sleeve is urged against the lock ring, the auxiliary port is closed to prevent fluid from flowing therethrough, and the first and second seals sealingly engage the stem and sleeve; and
   wherein the sleeve may be forcibly translated against spring pressure along the stem away from the lock ring so as to open the auxiliary port and allow fluid to flow therethrough.

2. The valve of claim 1 further comprising a bellows having a first end and a second end, the first end of the bellows being sealed to the sleeve and the second end of the bellows being sealed to the stem between the spring and the base end.

3. The valve of claim 1, wherein the post end and the base end of the stem are threadably joined.

* * * * *